Jan. 16, 1962   J. E. FIKES   3,016,742
SERVO-VANE PITCH AND YAW INDICATOR
Filed June 23, 1959   5 Sheets-Sheet 1

Joseph E. Fikes
*INVENTOR.*

BY S. J. Rotondi,
A. T. Dupont, and
Alvin E. Moore,
ATTORNEYS

Jan. 16, 1962 J. E. FIKES 3,016,742
SERVO-VANE PITCH AND YAW INDICATOR
Filed June 23, 1959 5 Sheets-Sheet 2

Joseph E. Fikes
INVENTOR.

BY S. J. Rotondi,
A. T. Dupont, and
Alvin E. Moore,
ATTORNEYS

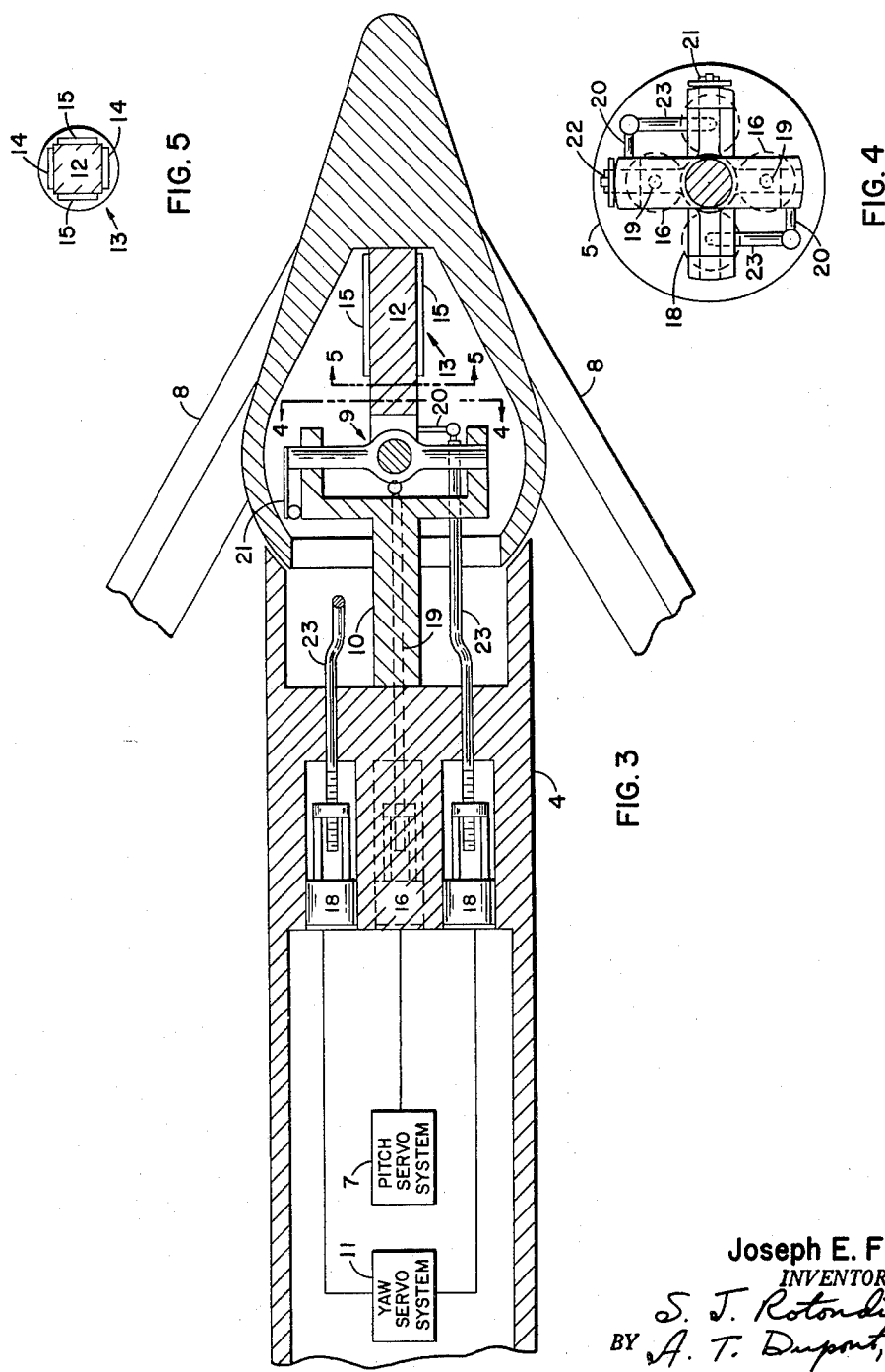

Jan. 16, 1962 J. E. FIKES 3,016,742
SERVO-VANE PITCH AND YAW INDICATOR
Filed June 23, 1959 5 Sheets-Sheet 4

Joseph E. Fikes
*INVENTOR.*
BY S. J. Rotondi,
A. T. Dupont, and
Alvin E. Moore,
ATTORNEYS

United States Patent Office 3,016,742
Patented Jan. 16, 1962

3,016,742
SERVO-VANE PITCH AND YAW INDICATOR
Joseph E. Fikes, Huntsville, Ala., assignor to the United States of America as represented by the Secretary of the Army
Filed June 23, 1959, Ser. No. 822,402
16 Claims. (Cl. 73—147)
(Granted under Title 35, U.S. Code (1952), sec. 266)

The invention described herein may be manufactured and used by or for the Government for governmental purposes without the payment of any royalty thereon.

This invention relates to a missile pitch and yaw indicator. It comprises means for indicating angles of attack in either a pitch or yaw direction, between the missile's longitudinal axis and the relative wind.

In devices of the above type, pressure differentials obtained from orifices or slots are generally used for indicating changes in angles of inclination and supplying signals to control units. It has been found, however, that when such devices are employed in missiles, for example, there is a need for an indicator having higher sensitivity. Also, there is a need for an indicator for registering very small angularity. There is a further need for an indicator with very low friction in the angle sensing system, thus allowing accurate results in rarefied air at high altitudes. There is also a need for an indicator of this type which is especially suitable for use in wind tunnels.

In view of these facts, an object of this invention is to provide an indicator having very high sensitivity.

Another object is to provide an indicator which will accurately register very small angularity.

A further object of the invention is to provide an indicator which allows accurate results in the rarefied air of high altitudes, due to very low friction in the angle sensing system.

A further object of the invention is to provide an indicator suitable for use in wind tunnel testing or free flight.

The foregoing and other objects of this invention will become more fully apparent from the following detailed description and from the accompanying drawings, in which:

FIGURE 3 is a view, similar to FIGURE 2, but showing electrical actuators as replacing the fluid motors of FIGURE 2.

FIGURE 4 is a sectional view taken from the plane of line 4—4 of FIGURE 3.

FIGURE 5 is a sectional view taken from the plane of line 5—5 of FIGURE 3.

Figure 1:
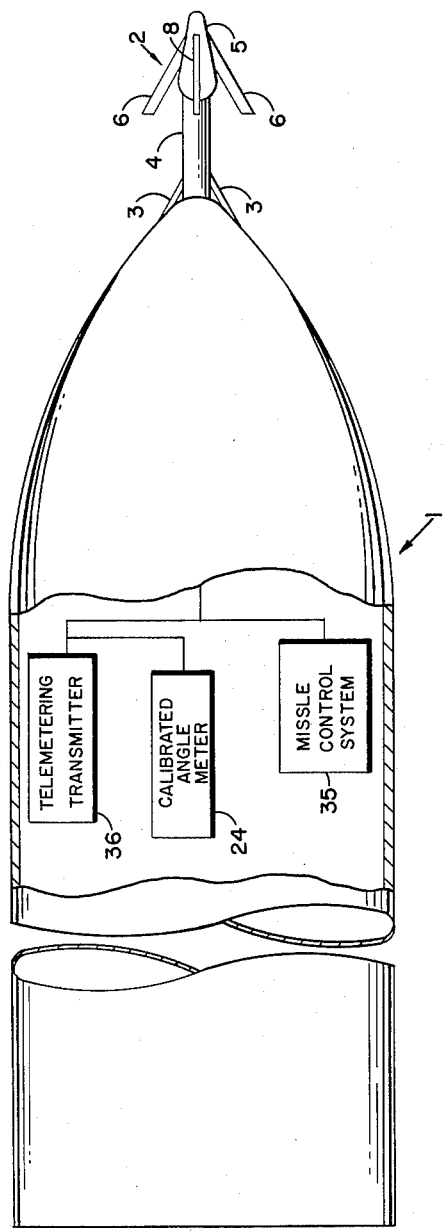
FIGURE 1 is an elevational view showing the indicator connected to a missile body, which is partially broken away for indicating three different systems, which may be used simultaneously or alternately, in utilizing the information received from the signal pick off means.
Figure 2:
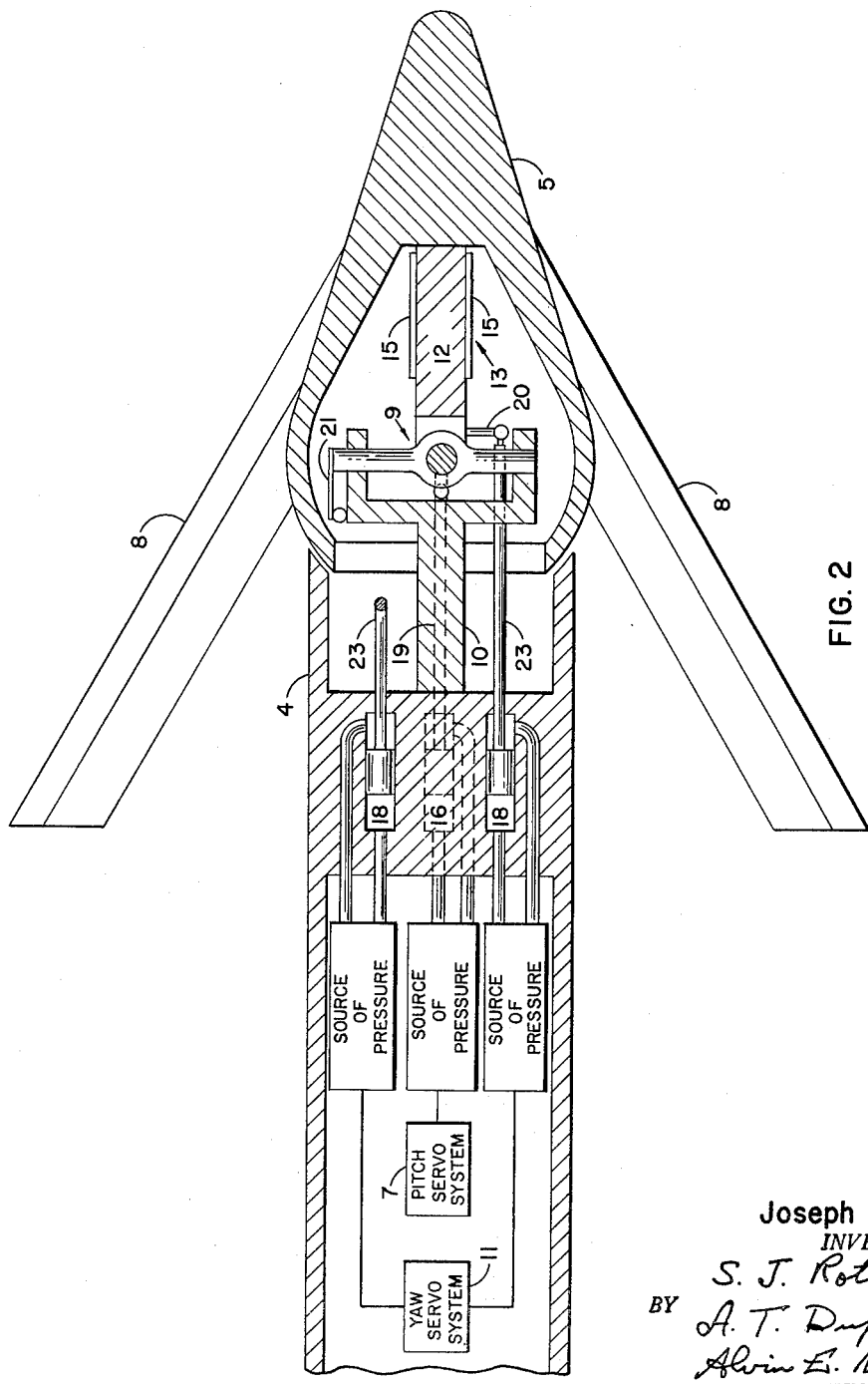
FIGURE 2 is a sectional view showing the arrangement of the components housed by the indicator body.
Figure 6:
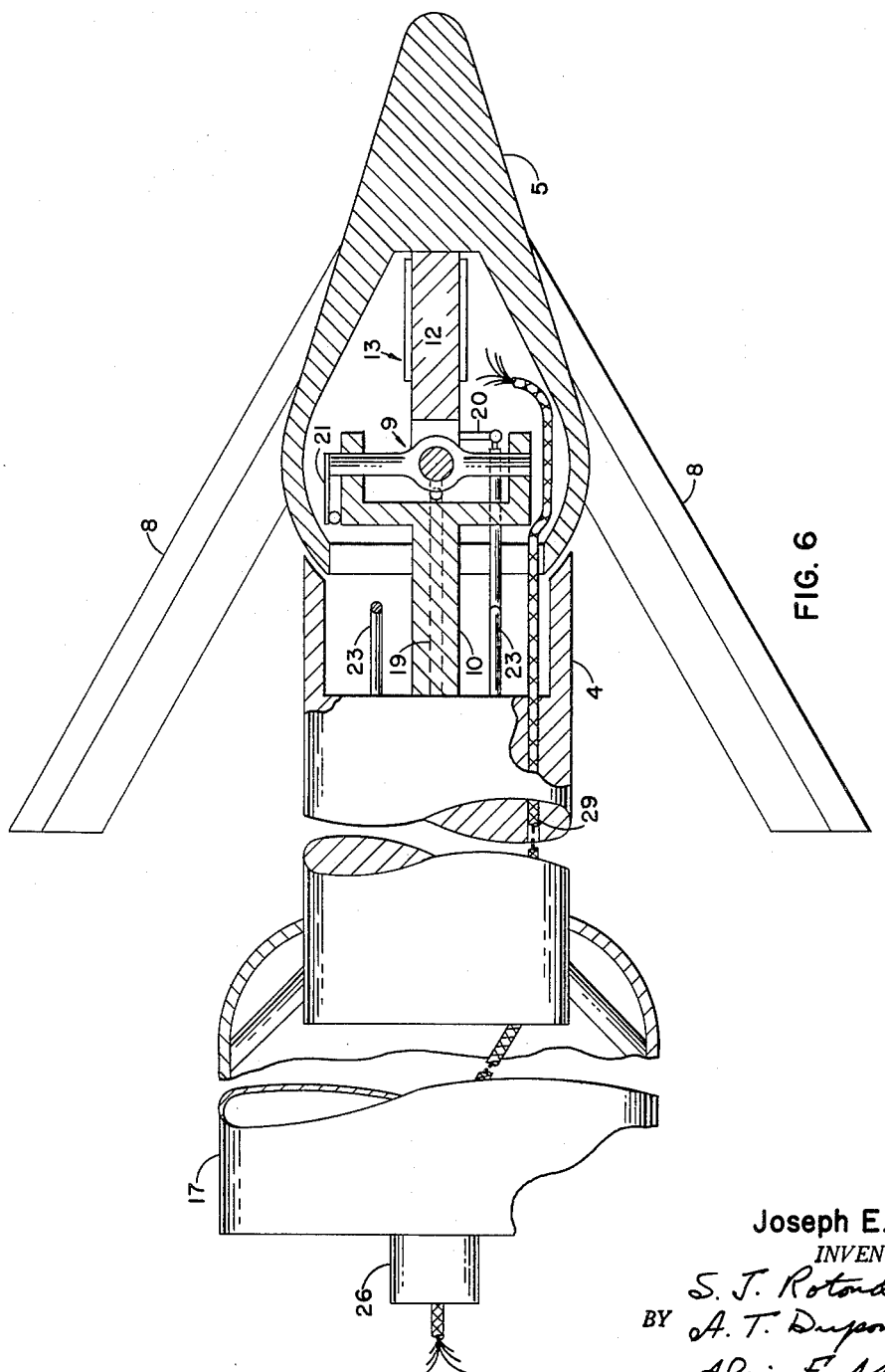
FIGURE 6 is a view partially broken away, showing the indicator adapted for use with a wind tunnel model, and an alternate bracing arrangement, which also may be applied to FIGURE 1.
Figure 7:
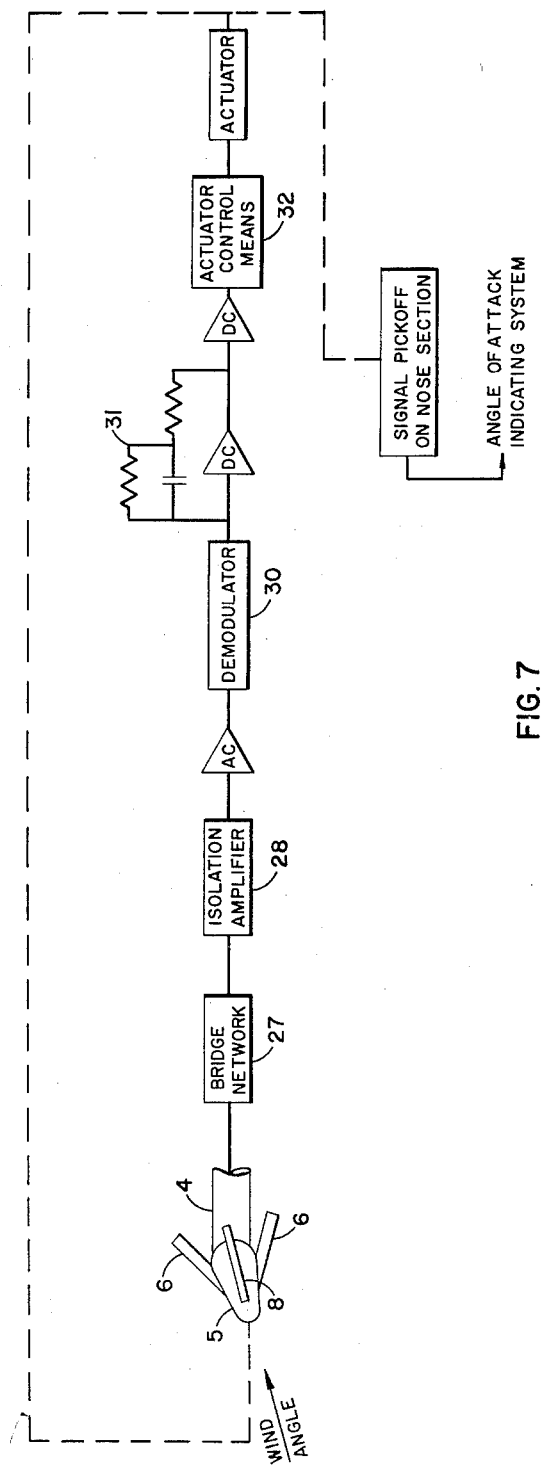
FIGURE 7 is a semi-block diagram of the servo system for the strain-gauge, angle-of-attack indicator, which may be used in either the pitch or yaw indicating system.

In the drawings, wherein for the purpose of illustration there are shown preferred embodiments of the invention, and particularly in FIGURE 1, numeral 1 designates a missile body having a wind sensing assembly 2 secured to its nose by braces or other suitable means 3.

Sensing assembly 2 comprises a boom 4 attached to said missile nose, a second section 5 universally mounted on said boom, a pair of yaw control surfaces 6 and a pair of pitch control surfaces 8, attached to said second section and movable therewith.

The second or nose section is movably secured to said boom by a universal joint 9, which allows the nose section to move about the axes of said joint.

Universal joint 9 has one end 10 secured to said boom and the other end 12, which comprises a flexible beam, secured to said nose section. End 12 contains a strain gauge assembly 13, having a pitch section 14 and a yaw section 15, fixed intermediate the ends of the beam. Said gauge assembly is influenced by deformation of the metal of the beam, as it bends, and thus initiates an electrical signal when there is any movement of the center line of the nose section in a pitch or yaw direction, relative to a cross wind.

Strain gauge 13 and servo systems 7 and 11 control the operation of two pairs of electric or fluid actuators 16 and 18. Actuators 16 are connected to part of the universal joint by rods 19, for control and movement of said joint when the aerodynamic force on the nose section departs from the line of the missile's longitudinal axis, thus causing unbalanced forces to be exerted on the two opposite vanes 8. The other two actuators 18 are connected to the joint, by a ball and socket between rods 23 and bellcrank arms 20, for control and movement of the joint when unbalanced aerodynamic forces are exerted on yaw control surfaces 6. By means of this control, the actuators move the joint-end of beam 12, until it is no longer bent, because it is then in line with the resultant of the aerodynamic forces.

Universal joint 9 also has a pair of potentiometers 21 and 22 connected to it. The potentiometers may be replaced by a pair of differential transformers. Pitch and yaw potentiometers 21 and 22, respectively, are designed to operate in two directions, each having a zero point at its center. Pitch potentiometer 21 is connected to one axis of joint 9, so as to operate when nose section 5 is moved about said axis. Yaw potentiometer 22 is connected in the same manner as potentiometer 21, but on the other axis of said joint, so as to operate when the nose section is moved about said other axis.

Each potentiometer provides an electrical signal which is a measure of the angle of the aerodynamic force relative to the missile's axis. The pitch potentiometer also indicates whether the direction of this force is up or down and the yaw potentiometer whether the direction is right or left due to the fact that the wiper arm may move in either direction from its center position. This indicator of direction preferably is achieved by applying a negative voltage to one side of the potentiometer and a positive voltage to the other side, so that the polarity of each of the electrical signals from the potentiometers depends on the direction of the force.

When supplied to meter 24, these signals cause the meter to indicate the angle and direction of the resultant aerodynamic force, relative to each of the pitch and yaw axes. Optionally, these two signals, indicating angles of attack about the pitch and yaw axes, may be integrated in the meter, so that the instrument indicates the resultant line of all the aerodynamic forces.

This meter is of use to personnel if the missile is under human control. The meter may be used with or without either or both of the two other systems shown in FIGURE 1. One of these systems utilizes a telemetering transmitter 36 which receives the angle signal from the pick-off potentiometers (or differential transformers) and transmits it back to earth. This signal could be evaluated and stored for future use, or used for sending a correcting signal to the missile. The other system comprises an inertial guidance system, which receives signals from the potentiometer (or differential transformer) and makes the necessary corrections for returning the missile to its course. Regardless of which system is used (meter 24, transmitter 36, or system 35) it operates in response to movement of potentiometers 21 and 22.

The vaned sensing assembly also may be used in wind tunnels. This adaptation includes elimination of any connections from the potentiometers to the missile model 17 and the addition of a "sting" 26 to the model. This sting has one end connected to the model, so as to allow its wiring 29 to pass thru the model and connect to the potentiometers. The other end of sting 26 is connected to the wind tunnel wall or floor so as to allow the wire, that conveys current to and from the nose section to pass thru the wind tunnel. In this modification, the calibrated meter, which evaluates the electrical signals, is located outside the model and the tunnel.

*Operation*

The operation of the indicator is as follows:

Sensing assembly 2 is connected to the nose of a missile, which is placed in flight. While the missile is dealing with only one aerodynamic force, the centerline of nose section 5 of the assembly will remain in alignment with the centerline of the boom 4 and missile body 1.

When the relative wind changes, and the resultant, new aerodynamic force is on a line of attack across the missile's axis, for example in a lift direction, the nose section of the assembly is turned toward the direction of the force. Since the universal joint is restrained against movement by actuators 16 and 18 a bending moment is set up in beam 12.

When beam 12 bends, for example due to a lifting force, the pitch strain-gauge section is deformed, and misalignment between the two gauges in the pitch section occurs, causing an electrical signal to be produced. The two gauges form part of a very sensitive bridge network 27, which sends the electrical signal, that is proportional to the magnitude of the misalignment between the assembly head and the wind, and indicative of the sense of the misalignment, to an isolation amplifier 28.

The signal is passed from amplifier 28 thru demodulator 30, integrating amplifier 31, and to actuator control means 32. The control means operates the actuators (in this example, actuators 16), which by means of their rod connectors, turn the universal joint about one of its axis, and brings the nose section into the wind. When the nose section is aligned into the wind, by the turning of the universal joint, the signal created by the strain gauges ceases, thereby stopping the operation of the actuator control means.

During the turning of the universal joint the pitch potentiometer, which is operably connected to said joint, is picking off a continually changing signal. When the turning of said joint about said axis stops, due to alignment of the nose section with the wind, the potentiometer will continue to provide a signal, which, when applied to a calibrated angle meter, continuously gives the angle between the boom centerline and the nose section's centerline, which is equal to the angle of attack. Indication of this angle of attack then may be used by personnel aboard the craft for control of the missile, to correct for the direction-disturbing effect of the cross wind. This indication of the angle of attack also may be used by operators aboard the craft for other purposes. In a normal flight thru the atmosphere there would nearly always be an indication from the potentiometers of some angle of attack. On the other hand, signals from the strain gauges to the vane actuators occur only when the angle of attack changes, and cease when the axis of the nose section becomes aligned with the resultant of the aerodynamic forces of the cross wind and the missile's translation.

The angle of attack signal can also be conducted to the missile control system 35 for the purpose of correcting error in the flight of the missile due to the aerodynamic force of a cross wind.

A third use of the angle of attack signal is in a telemetering transmitter 36 which transmits the signal back to earth where it can be utilized in a command guidance system and/or recorded for future study.

The operation of the wind-tunnel embodiment is the same, except that the angle of attack signal is fed thru the sting to the proper external instruments for obtaining results of the tests.

It is to be understood that the forms of the invention that are herein shown and described are preferred embodiments, and that various changes in the shape, size and arrangement of parts may be resorted to without departing from the spirit of the invention, or the scope of the subjoined claims.

The following invention is claimed:

1. A missile pitch and yaw indicator comprising: a support; a partially hollow boom mounted on said support; a universal joint comprising one pair of pivots having a pitch axis and another pair of pivots having a yaw axis, said universal joint having one end secured to said boom; a plurality of actuators secured to said boom, said actuators being divided into two groups, one group attached directly to said joint and adapted to move said joint in a pitch direction, the other group attached to said joint by bellcranks and adapted to move said joint in a yaw direction; servo means, secured to the inside of said boom, adapted to control said actuators; a flexible beam, secured to said boom, fixed to another end of said joint; a multisection strain gauge fixed to the intermediate portion of said beam, an electrical circuit connecting said gauge and said servo means; a partially hollow nose section secured to said beam, said nose section adapted to move within the limits of the axes of said joint; a pair of pitch-sensitive vanes secured to said nose section on opposite sides of the pitch axis of said joint; a pair of yaw-sensitive vanes secured to said nose section on opposite sides of the yaw axis of said joint; a pitch potentiometer comprising one part attached to one of said pitch-axis pivots and another part attached to said boom, whereby said one part rotates relative to the other part when the direction of the resultant aerodynamic force on said support is at an angle with the longitudinal axis of said boom and with said pitch axis, said one part being adapted to move in either direction from a zero center point; a yaw potentiometer having one part attached to one of the yaw-axis pivots of said joint and another part attached to said beam, said last-named one part moving when the direction of the resultant aerodynamic force is at an angle with the longitudinal axis of said boom and with said yaw axis, said yaw potentiometer being adapted to move in either direction from a zero center point; means connected to said pitch potentiometer and to said yaw potentiometer, responsive to movement of said potentiometers.

2. A missile pitch and yaw indicator comprising: a support; a boom mounted on said support; a nose section supported by said boom; means, connected to said boom, for universally mounting said nose section on said boom; a flexible beam having one end secured to said nose section and the other end supported by said mounting means; control means, inside said boom, connecting said boom to one end of said flexible beam, for adjusting the position of said last-named end relative to said boom and holding said last-named end in an adjusted position; powered means, secured to the inside of said boom and connected to said control means, for actuating said control means; electrical pickoff means, in said nose section, having one portion connected with said boom and another portion connecting with part of said mounting means, adapted to operate in either of two opposite directions in one plane; a second electrical pickoff means, in said nose section, having one portion mounted on said nose section, adapted to operate in either of two opposite directions in a second plane; a pair of pitch sensitive vanes secured to said nose section and adapted to be influenced by an aerodynamic force thus moving said nose section about a pitch axis; a pair of yaw sensitive vanes secured to said nose section and adapted to be influenced by an aerodynamic force, thus moving said nose section about a yaw axis; strain-sensing gauges fixed to an intermediate portion of said beam, adapted to be influenced by strain in the material of said beam when the beam flexes in either of said two planes; means responsive to operation of said electrical pickoff means and said second electrical pickoff means.

3. A device as set forth in claim 2, in which said first-named means is a universal joint.

4. A device as set forth in claim 2, in which said second-named means comprises a plurality of fluid motors and a plurality of rods connecting said motors and said first-named means.

5. A device as set forth in claim 2, in which said powered means comprises a plurality of servo systems.

6. A device as set forth in claim 2, in which said strain-sensing gauges comprise a yaw section and a pitch section.

7. A device as set forth in claim 2, wherein said first-named pickoff means constitutes a pitch potentiometer, a pivotal element which is fixed to said first-named mounting-means part.

8. A device as set forth in claim 2, wherein said second-named pickoff means constitutes a yaw potentiometer, a pivotal element which is fixed to said second-named mounting-means part.

9. A device as set forth in claim 2, in which said support is a space vehicle.

10. A device as set forth in claim 2, wherein said means responsive to operation of said electrical pickoff means and said second electrical pickoff means comprises a telemetering transmitter, and electrical means connecting said transmitter and said electrical pickoff means and said second electrical pickoff means, whereby signals representing the angle of attack of the aerodynamic force on said boom are sent back to earth.

11. A device as set forth in claim 2, in which said means responsive to operation of said electrical pickoff means and said second electrical pickoff means comprises an inertial guidance system, and electrical means connecting said system and said electrical pickoff means and said second electrical pickoff means, whereby signals from said pickoff means are evaluated for correction of the vehicle's flight.

12. A device as set forth in claim 2, wherein said means responsive to operation of said electrical pickoff means and said second electrical pickoff means comprises means for converting signals from said electrical pickoff means and said second electrical pickoff means into angle readings, whereby said reading can be used by personnel on board said vehicle.

13. A wind-tunnel model assembly comprising: a model subject to aerodynamic forces; an elongated support having one end fixed to the after end of said model and the other end adapted to be fixed to a wind tunnel; a boom mounted on said model; a nose section supported by said boom; means, connected to said boom, for universally mounting said nose section on said boom; a flexible beam having one end secured to said nose section and the other end supported by said mounting means; control means, secured inside said boom connecting said boom to one end of said flexible beam, for adjusting the position of said last-named end relative to said boom and holding said last-named end in an adjusted position; powered means, connected to the inside of said boom, for actuating said control means; electrical pickoff means, in said nose section, having one portion connected with said boom and another portion connecting with part of said mounting means, adapted to operate in either of two opposite directions in one plane; an electrical second pickoff means, in said nose section, having one portion mounted on a second part of said mounting means and another portion mounted on said nose section, adapted to operate in either of two opposite directions in a second plane; a pair of pitch sensitive vanes secured to said nose section and adapted to be influenced by an aerodynamic force, thus moving said nose section about a pitch axis; a pair of yaw sensitive vanes secured to said nose section and adapted to be influenced by an aerodynamic force, thus moving said nose section about a yaw axis; strain-sensing gauges fixed to an intermediate portion of said beam, adapted to be influenced by strain in the material of said beam when the beam flexes in either of said planes.

14. A device as set forth in claim 13, in which said second-named means comprises a plurality of fluid motors and a plurality of rods connecting said motors and said first-named means.

15. A device as set forth in claim 13, in which said powered means comprises a plurality of servo systems.

16. A device as set forth in claim 13, which further comprises means for supplying electric power to said servo system, and electrical conducting means connected to said electrical pickoff means and said second electrical pickoff means and extending externally of said support.

References Cited in the file of this patent

UNITED STATES PATENTS

| | | |
|---|---|---|
| 2,700,305 | Kendall | Jan. 25, 1955 |
| 2,725,746 | Young | Dec. 6, 1955 |
| 2,736,198 | Kuhn | Feb. 28, 1956 |
| 2,855,779 | Zaid | Oct. 14, 1958 |
| 2,875,965 | Anderson et al. | Mar. 3, 1959 |